July 17, 1951 — O. E. DAY — 2,560,850
TACTUAL MICROMETER
Filed Nov. 18, 1946

INVENTOR
ORVILLE E. DAY
BY Hyde W. Ballard
ATTORNEY

Patented July 17, 1951

2,560,850

UNITED STATES PATENT OFFICE 2,560,850

TACTUAL MICROMETER

Orville E. Day, Philadelphia, Pa.

Application November 18, 1946, Serial No. 710,493

12 Claims. (Cl. 33—164)

My invention relates to instruments adapted to be used by incapacitated persons, and particularly to a tactual micrometer which can be easily read by either a blind or a blind and deaf person.

It is well known that people having physical handicaps such as total blindness as well as total blindness and deafness are unable to perform many operations normally requiring the use of the eyes. Precision inspection of machined parts is an operation which ordinarily requires the best eyesight and as a consequence it is impossible for blind persons to obtain employment in this capacity because of their inability to utilize the precision tools required, all of which must be read by means of the eye.

An object of my invention therefore is to provide in a measuring instrument means whereby the setting of the instrument can be quickly determined by an operator without the use of eyes or ears.

A further object of my invention is to provide a micrometer having longitudinal graduations whereby the position of the micrometer thimble with respect to the hub can be ascertained by means of the operator's sense of touch.

A still further object of my invention is to provide a micrometer having indentations in the micrometer hub whereby an operator by means of his sense of touch can determine the fraction of a turn made by the micrometer thimble, and also the number of complete turns of the thimble from a predetermined zero setting.

A still further object of my invention is to provide a micrometer thimble having a spring loaded ball carried therein, the ball being adapted to give tactual readings when rotated over a series of indentations in the micrometer hub.

A still further object of my invention is to provide a master setting gauge for enabling a blind operator to make predetermined micrometer settings.

Further objects will be apparent from the specification and drawings, in which.

While certain novel features of the invention are disclosed herein with considerable detail with respect to certain particular forms of the invention, it is not desired to be limited to such details since many changes and modifications may well be made without departure from the spirit of the invention in its broadest aspect.

The ability of a blind operator or of a blind and deaf operator to use even the commonest machine shop tools must, of necessity, depend upon the operator's sense of touch, although in some instances it has been possible to achieve a limited amount of success in this field in the case of blind operators who are nevertheless able to hear. The construction embodied in my invention is a modification of the conventional machinist's micrometer, but it will be apparent that my tactual measuring head can be applied to many other types of mechanisms, for example, a lathe, shaper, or milling machine.

Figure 1:
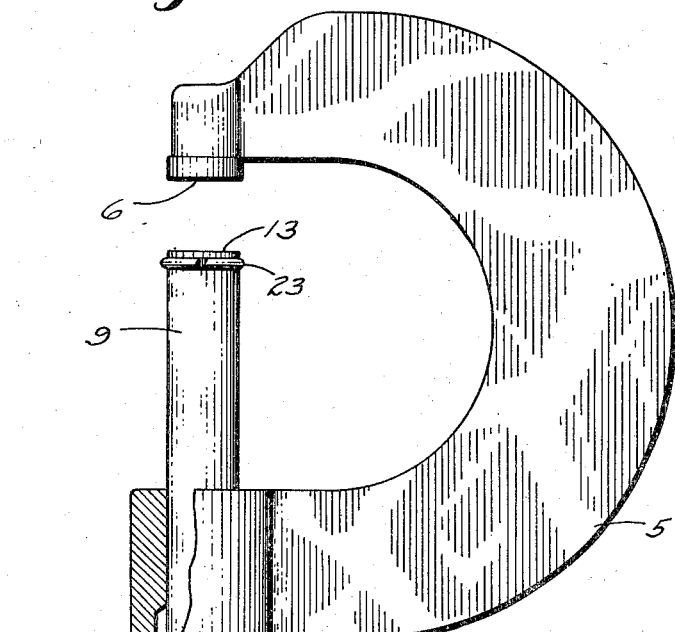
Fig. 1 is a side elevation, partly sectioned, of a micrometer constructed according to my invention, and shows the micrometer thimble partly broken away.

Referring now more particularly to the drawings, the micrometer of Fig. 1 has a conventional frame 5 which carries an anvil 6 at one extremity and a hub 7 at the other. Hub 7 is internally threaded at 8 to receive spindle 9, which has a threaded portion at 10 and carries a thimble 11 adapted to enclose hub 7. Thimble 11 has a knurled portion 12 and is otherwise constructed in the conventional manner, except as described hereinafter. The pitch of threads 8 and 10 is such that one revolution of thimble 11 longitudinally moves spindle end 13 a predetermined fraction of a measuring unit with respect to anvil 6.

Instead of the customary transverse visual gradations on the hub of the micrometer, longitudinal divisions or graduations in the form of grooves 14 are milled or cut lengthwise along the outer periphery of the hub 7. The spacing of grooves 14 with respect to each other depends upon the units to be measured with the micrometer, but will indicate equal fractions of a turn of the thimble. Grooves 14 are of uniform width and depth, whereas groove 15, which indicates the starting position for a thimble revolution, is substantially wider than grooves 14.

Thimble 11 carries a hollow cylindrical knob 16 extending at right angles thereto, adapted to enclose a steel ball 17, helical spring 18 and set screw 19. Knob 16 in effect takes the place of the conventional calibrations on the ordinary micrometer thimble and the addition of the knob, spring, and steel ball is the only modification necessary in so far as the thimle is concerned.

The width of grooves 14 and 15 in relation to the diameter of steel ball 17 is such that a noticeable click can be both felt and heard as thimble 11 is rotated about hub 7. The width of groove 15 is such that the difference, both in the sound and in the feeling, clearly enables the operator to determine when thimble 11 is turned to align ball 17 with groove 15. Turning the thimble in either direction from this position produces both audible and tactual readings which are readily counted by the operator to determine the fraction of a turn made by the thimble.

In order to provide reference points for the thimble so that no more than a limited number of turns must be kept in mind by the operator for any particular measurement, a master gauge 20, having a series of cylindrical steps 21, each step being of a known diameter, can be utilized. Before making the measurement the operator merely adjusts the thimble over the appropriate step of the master gauge, the diameter of which is known, and by turning thimble 11 sufficiently to measure the desired object, the operator is enabled to obtain an accurate micrometer reading simply by adding the number of thimble turns to the original setting, plus the additional fractional turn.

Figure 2:
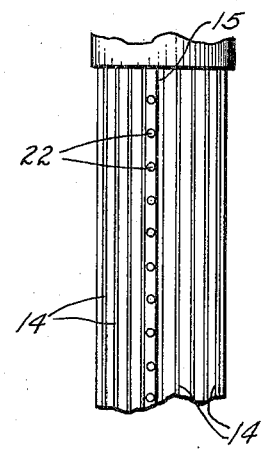
Fig. 2 is a detail of the micrometer hub of Fig. 1.
Figure 3:
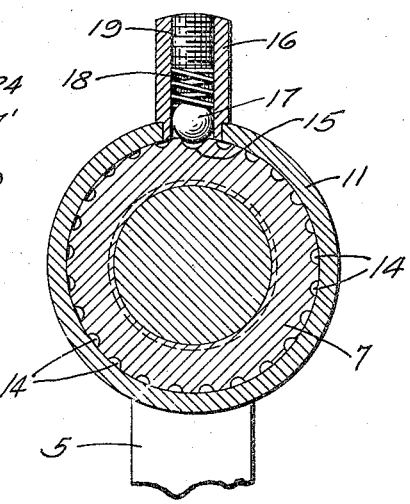
Fig. 3 is a section taken along lines 3—3 of Fig. 1.
Figure 4:
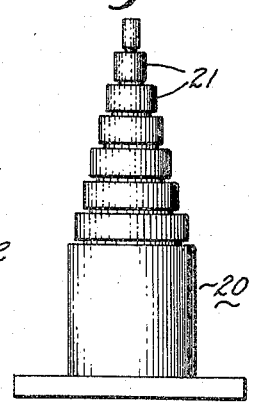
Fig. 4 shows a master setting gauge for use in conjunction with the micrometer.

An alternate method for enabling the operator to determine the position of the thimble with respect to the nearest tenth of an inch, for example, is illustrated by Fig. 2, in which each tenth of an inch is designated by a circular indentation 22 alongside the wide groove 15. In this form it becomes only necessary that the operator count the number of indentations which have been contacted by the steel ball 17 in turning thimble 11. If, as in the conventional micrometer, there are four thimble revolutions to a tenth of an inch, the operator can readily ascertain the nearest tenth, count the number of revolutions up to four, and add the fractional revolution in a manner very similar to that employed by the user of a conventional micrometer.

To prevent inadvertent turning of thimble 11 completely out of hub 7, a spring lock 23, near the end 13 of spindle 9, is provided.

Fig. 1 illustrates a form of construction in which hub 7 is non-rotatable with respect to frame 5. In this form, a zero adjustment for groove 15 with respect to ball 17 is made by relative turning of thimble 11 with respect to spindle 9, since no movement of hub 7 with respect to frame 5 is possible in this form. However, it will be readily understood that alternate means for zero correction can be utilized in conjunction with my invention. The conventional practice of some micrometer manufacturers in this respect employs a hub member comprising a sleeve 24 (Fig. 5), which fits over hub 7' and on which sleeve the grooves 14 and 15 may be milled, instead of on the hub proper. By rotating sleeve 24 with respect to hub 7, zero adjustment within the limit of one turn can be readily made. In this form of my present invention, the hub 7' and its surrounding sleeve 24 constitute a hub member corresponding in purpose and function to the hub member 7 previously described, but possessing the added advantage that the sleeve 24 provides for zero setting adjustment.

Figure 5:
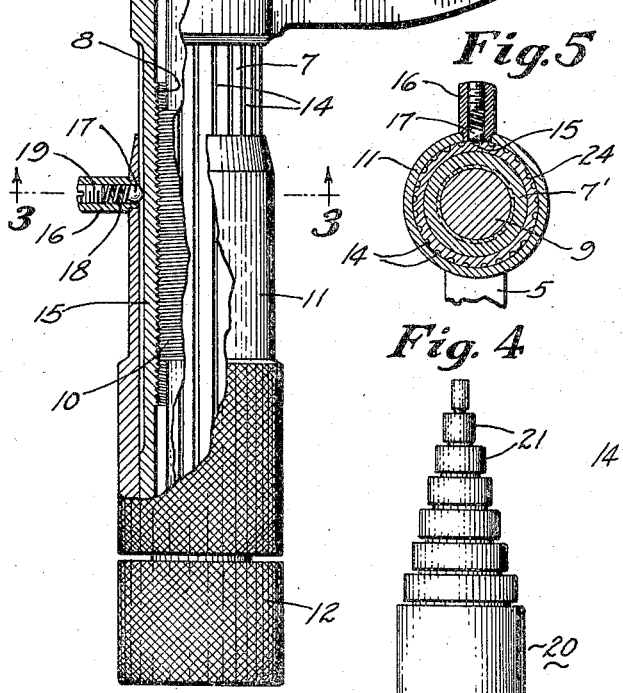
Fig. 5 is a section similar to Fig. 3 but showing my invention adapted to a modified form of micrometer construction.

In effect the construction of Fig. 5 insofar as sleeve 24 is concerned merely renders the hub 7 movable with respect to frame 5, which carries anvil 6, and therefore the sleeve may be considered to be a part of the hub member. The same result could readily be achieved by means of a solid hub rotatable as a unit in the frame. It will be understood, however, that the specific means for obtaining correct zero adjustment does not form a part of my invention, since it is adapted for use with any one of the conventional micrometers, regardless of the adjusting device employed.

It will thus be apparent that I have constructed a tactual head for a precision measuring instrument, such as a micrometer, which can be readily employed by either a blind operator or a blind and deaf operator, because the micrometer setting can be read entirely by means of touch, although it will be appreciated that the graduations may be detected by ear as well as tactually.

Furthermore, the construction is admirably adapted to be made with a minimum of change in standard micrometer manufacturing practice.

Having thus described my invention, I claim:

1. A micrometer having a frame, an anvil on the frame, a hub attached to the frame and having a plurality of longitudinal grooves cut therein, said hub being internally threaded, a spindle adapted to be threaded in the hub, a thimble attached to the spindle, and means carried by the thimble for contacting the longitudinal grooves to produce tactual indications of the micrometer setting.

2. A micrometer having a frame, an anvil on the frame, a hub attached to the frame and having a plurality of longitudinal grooves cut therein, said hub being internally threaded, a spindle adapted to be threaded in the hub, a thimble attached to the spindle, means carried by the thimble for contacting the longitudinal grooves to produce tactual indications of the micrometer setting, and locking means on the spindle for preventing inadvertent disengagement of the spindle and the hub.

3. A micrometer having a frame, an anvil on the frame, a hub attached to the frame and having a plurality of longitudinal grooves cut therein, said hub being internally threaded, a spindle adapted to be threaded in the hub, a thimble attached to the spindle, and a spring loaded ball carried by the thimble for producing tactual indications as the ball contacts the longitudinal grooves.

4. A precision measuring head comprising a threaded member, a series of equally spaced indentations on said threaded member, a second member threadedly engaged with the first threaded member and capable of axial movement with respect thereto, and means on said second threaded member for producing tactual indications of relative rotation of the members when said means registers with one of said indentations.

5. A precision measuring head comprising a threaded member, a series of equally spaced indentations on said threaded member, one of said indentations being of different size from the other indentations to provide a reference point, a second threaded member cooperating with the first threaded member, and means on said second threaded member for producing tactual indications of relative rotation of the members when said means registers with one of said indentations.

6. A micrometer having a frame, an anvil on the frame, a hub attached to the frame and having a plurality of longitudinal grooves cut therein, said hub being internally threaded, a plurality of indentations axially spaced on the hub for indicating a predetermined known number of thimble turns, a spindle adapted to be threaded in the hub, a thimble attached to the spindle, and means carried by the thimble for contacting the longitudinal grooves to produce a tactual indication of the micrometer setting.

7. In micrometer construction, a frame, an anvil on said frame, a hub attached to said frame, a spindle threaded in said hub and adapted to abut said anvil, a thimble carried by the spindle for turning said spindle in the hub, a spring loaded ball carried by said thimble for contacting the hub, and means associated with said hub for registering contact of the ball therewith as the thimble is turned.

8. In micrometer construction, a frame, an anvil on said frame, a hub member carried by said frame, a plurality of longitudinal grooves associated with said hub member, a spindle threaded in said hub member and having an end portion adapted to abut said anvil, a thimble carried by the spindle for turning said spindle, and means on said thimble for contacting the longitudinal grooves to produce tactual indications of the micrometer setting.

9. In micrometer construction, a frame, an anvil on said frame, a hub attached to the frame, a sleeve surrounding said hub and rotatable thereon to effect zero setting of said sleeve, said sleeve having longitudinal grooves cut in the outer surface thereof, a spindle threaded in said hub and adapted to abut said anvil, a thimble carried by the spindle for turning said spindle in the hub, and means on said thimble for contacting the longitudinal grooves of said sleeve to produce tactual indications of the micrometer setting.

10. In micrometer construction, a frame, an anvil on said frame, a hub attached to said frame, a spindle threaded in said hub and adapted to abut said anvil, a thimble carried on said spindle for turning said spindle in the hub, a spring-loaded ball carried by said thimble for contacting the hub, a zero setting sleeve rotatably positioned around said hub, and means on the periphery of said sleeve for registering contact of the ball therewith as the thimble is turned.

11. A precision measuring head comprising a threaded member, a second member threadedly engaging said first threaded member and rotative with respect thereto, rotation of one of said members causing relative axial movement between said members, a series of circumferentially and equally spaced, longitudinally extending means on one of said members, and contact means on the other of said members for producing tactual indications of relative rotation of said members when said contact means registers with one of said longitudinally extending means.

12. A micrometer having a frame; an anvil on said frame; a hub member carried by said frame and comprising an internally threaded portion, and an external portion having a plurality of spaced, longitudinally extending grooves therein; a spindle adapted to be threaded in said hub member and to engage the internally threaded portion thereof; a thimble attached to said spindle; and means carried by the thimble for successively contacting the longitudinally extending grooves on said external portion of said hub member to produce tactual indications of the micrometer setting when said last mentioned means registers with one of said longitudinally extending grooves.

ORVILLE E. DAY.

REFERENCES CITED

The following references are of record in the file of this patent:

UNITED STATES PATENTS

| Number | Name | Date |
| --- | --- | --- |
| 797,745 | Pitman | Aug. 22, 1905 |
| 861,582 | Fildes | July 30, 1907 |
| 2,267,332 | Hagstrom | Dec. 23, 1941 |